(12) United States Patent
Panzer et al.

(10) Patent No.: US 7,252,797 B2
(45) Date of Patent: Aug. 7, 2007

(54) PROCESS FOR FABRICATION OF LOW BASIS WEIGHT ELECTRODE ACTIVE BLANKS

(75) Inventors: Brian D. Panzer, Williamsville, NY (US); William C. Thiebolt, III, Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 654 days.

(21) Appl. No.: 10/669,080

(22) Filed: Sep. 22, 2003

(65) Prior Publication Data

US 2005/0064290 A1 Mar. 24, 2005

(51) Int. Cl.
*B29C 43/24* (2006.01)
*B29B 9/00* (2006.01)

(52) U.S. Cl. ............... 264/104; 264/105; 264/122; 264/140; 264/175

(58) Field of Classification Search ............... None
See application file for complete search history.

(56) References Cited

U.S. PATENT DOCUMENTS

| | | |
|---|---|---|
| 3,898,099 A | 8/1975 | Baker et al. |
| 4,161,063 A | 7/1979 | Goebel et al. |
| 4,179,799 A | 12/1979 | Fritts |
| 4,310,609 A | 1/1982 | Liang et al. |
| 4,324,828 A | 4/1982 | Ebato et al. |
| 4,448,605 A | 5/1984 | Mizuhara |
| 4,556,618 A | 12/1985 | Shia |
| 4,812,376 A | 3/1989 | Rudolph |
| 4,830,940 A | 5/1989 | Keister et al. |
| 4,956,247 A | 9/1990 | Miyazaki et al. |
| 5,041,199 A | 8/1991 | DiFranco |
| 5,158,722 A | 10/1992 | Ilic et al. |
| 5,435,874 A | 7/1995 | Takeuchi et al. |
| 5,571,640 A | 11/1996 | Takeuchi et al. |
| 5,698,342 A | 12/1997 | Klein |
| 6,054,010 A | 4/2000 | Tanaka et al. |
| 6,171,723 B1 | 1/2001 | Loch et al. |
| 6,174,622 B1 | 1/2001 | Thiebolt, III et al. |
| 6,234,225 B1 | 5/2001 | Tanaka et al. |
| 6,284,405 B2 | 9/2001 | Kaido et al. |
| 6,582,545 B1 | 6/2003 | Thiebolt, III et al. |

*Primary Examiner*—Edmund H. Lee
(74) *Attorney, Agent, or Firm*—Michael F. Scalise

(57) ABSTRACT

The present invention is directed to calendaring an electrode active admixture, such as of a transition metal oxide, and particularly silver vanadium oxide, into an electrode structure. To obtain electrode structures of a desired low basis weight requires calendaring a paste of the active material into a first sheet tape, which is subsequently subjected to secondary and ternary calendering steps. Secondary calendaring is performed in a direction reverse or orthogonal to that used to form the initial sheet tape. The final calendaring step is performed in a third direction aligned 180° with respect to the first direction, but with the second structure rotated bottom over top with respect to the orientation that formed the first and second structures. The ternary calendaring step provides for fibrillation of the fluoro-polymeric binder in a direction reverse to the initial direction to form the product low basis weight electrode active structure.

13 Claims, 3 Drawing Sheets

US 7,252,797 B2

PROCESS FOR FABRICATION OF LOW BASIS WEIGHT ELECTRODE ACTIVE BLANKS

BACKGROUND OF THE INVENTION

1. Field of the Invention

The present invention relates to the conversion of chemical energy to electrical energy, and more particularly, to an alkali metal electrochemical cell having a positive electrode preferably comprising a transition metal oxide calendered into electrode blanks or plates for subsequent processing into an electrode.

2. Prior Art

Related U.S. Pat. Nos. 5,435,874 and 5,571,640, both to Takeuchi et al., which are assigned to the assignee of the present invention and incorporated herein by reference, are directed to a process for manufacturing a freestanding sheet of cathode material. The process involves first adjusting the particle size of the cathode active material to a useful size, followed by mixing with binder and conductivity enhancing additives suspended in a solvent to form a paste. The paste is fed into a series of roll mills that calender it into the freestanding sheet having a thickness in the range of about 0.004 inches to about 0.020 inches. Alternatively, the paste is first pelletized before being subjected to the calendering step. The resulting cathode sheet material is dried and punched into blanks that are subsequently contacted to a current collector to form an electrode.

The step of calendering or compacting the paste or, alternatively, calendaring the pelletized cathode active material, is performed by two to four calender mills that sequentially press the active admixture into the freestanding sheet in the form of a tape. Sequential calendering is performed by running the tape from one roll mill to the next with the roll mills contacting the cathode active material along a single direction of travel or direction of contact. Electrode blanks are then punched from the freestanding sheet.

The preferred cathode active materials described in the Takeuchi et al. patents are silver vanadium oxide (SVO) and copper silver vanadium oxide (CSVO). These materials are coupled with a lithium anode and activated by a nonaqueous electrolyte to provide a cell. Such high energy density cells are particularly useful as power sources for implantable medical devices, such as cardiac defibrillators.

U.S. Pat. No. 6,174,622 to Thiebolt, III et al., which is assigned to the assignee of the present invention and incorporated herein by reference, describes the production of low basis weight electrode structures by subjecting an electrode active mixture to a secondary calendering step performed in a direction reverse or orthogonal to that used to form the initial sheet tape. Calandaring in an orthogonal or reverse direction fibrillates the fluoro-polymeric binder in other than the initial direction. This lets the binder spread in transverse directions to lower the basis weight of the electrode active structures or blanks in comparison to electrode blanks produced by the previously discussed Takeuchi et al. patents.

However, there is a need to further lower the basis weight of electrode structures incorporated into high energy density electrochemical cells, such as of the type having lithium as an anode active material. Lowering basis weight is important for increasing the surface area of the electrode admixture. A greater electrode active surface area means that thinner electrodes can be produced, which results in more electrode plates per unit volume for an electrochemical cell. It is believed that a greater surface area results in improved discharge performance, such as increased energy density and rate capability and greater cycling efficiency for rechargeable cells.

SUMMARY OF THE INVENTION

Accordingly, the present invention relates to an improved process for providing blanks or plates of electrode active material. The electrode admixture subjected to calendering in a secondary rolling step according to the above-described Thiebolt, III et al. patent is subsequently subjected to a ternary calendaring step. As previously discussed, secondary calendaring is substantially orthogonal to the direction at which the first calendering step occurred or at a second direction, opposite the first. The resulting structure is further rotated to a reverse or 180° direction with respect to the original orientation and rotated 180° in a bottom over top manner before being calendered a final time. This ternary calendaring step yields an electrode admixture having a surface area greater than that which is provided by the prior art. The resulting calendered admixture is useful for constructing electrodes for both primary and secondary electrochemical cells.

These and other aspects of the present invention will become more apparent to those skilled in the art by reference to the following description and to the appended drawings.

DESCRIPTION OF THE PREFERRED EMBODIMENTS

As used herein, the term basis weight means the gram amount of an active material per surface area (gram/in$^2$).

The method of the present invention begins with an already prepared electrode active material. The starting active material is of the kind typically used as a cathode in a primary electrochemical cell or as the cathode or anode of a secondary electrochemical cell, but not limited thereto. The method involves manufacturing a blank and then an electrode from the blank for subsequent use in an electrochemical cell. The active material preferably comprises a metal, a metal sulfide, a metal oxide or a mixed metal oxide, preferably present in a granular form. Carbonaceous active materials are also useful as starting materials for forming electrode components by the process of the present invention.

Examples of active materials that may be formed into a cathode for a primary cell according to the present invention include silver vanadium oxide (SVO), copper silver vanadium oxide (CSVO), manganese dioxide, carbon, fluorinated carbon, titanium disulfide, cobalt oxide, nickel oxide, copper vanadium oxide, and others typically used in lithium anode cells. The active material for a secondary cell is preferably lithiated when the cell is manufactured and may or may not be used in combination with other metal oxide or metal sulfide materials. Lithiated materials are preferred because they are stable in air and readily handled. The more preferred oxides include $LiNiO_2$, $LiMn_2O_4$, $LiCoO_2$, $LiCu_{0.92}Sn_{0.08}O_2$, and $LiCO_{1-x}Ni_xO_2$. Among these, lithium cobalt oxide is most preferred.

Figure 1:
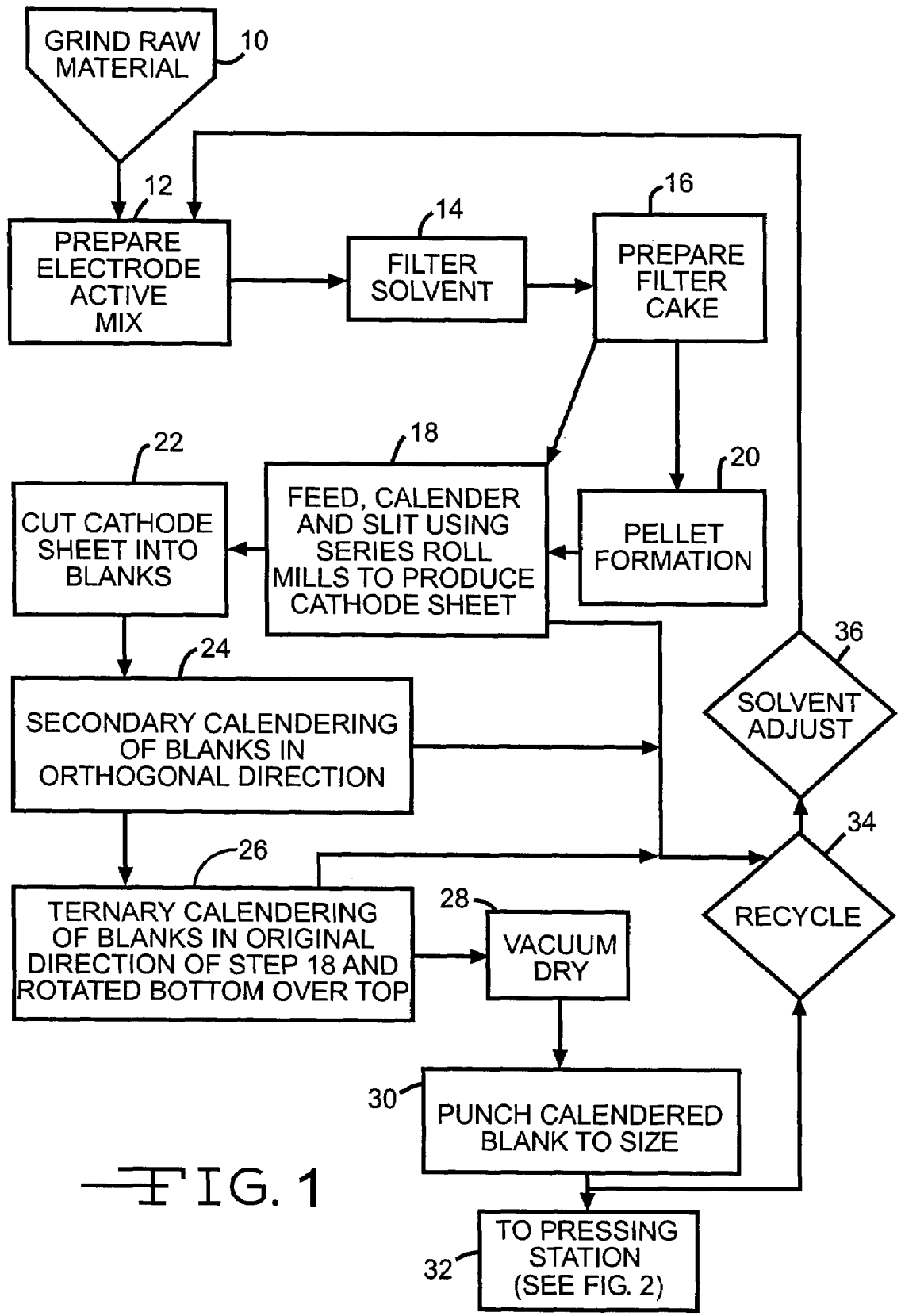
FIG. 1 is a block diagram and flow chart illustrating the steps involved in making an electrode active blank according to the present invention.

As illustrated in the block diagram flow chart of FIG. 1, the method of the present invention starts by taking granular electrode active material and adjusting the particle size to a useful range. This is done by comminuting the active material in attrition or grinding step 10. A ball mill or vertical ball mill is preferred and typical grinding times range from about 10 to about 15 minutes. The finely divided active material is preferably mixed with carbon black and/or graphite as conductive diluents and a fluoro-resin powder, such as polytetraflauoroethylene powder, as a binder material to form a depolarizer admixture in the step designated 12. Preferably, the admixture comprises about 3 weight percent of the conductive diluent and about 3 weight percent of the binder material. This is typically done in a solvent of either water or an inert organic medium such as mineral spirits. The mixing process provides for fibrillation of the fluoro-resin to ensure material integrity. In some cases, no conductor material is required. In any event, the cathode active material is preferably held between about 80% to about 99%, by weight. After mixing sufficiently to ensure homogeneity, the active admixture is removed from the mixer as a paste.

Following the mixing step, the solvent is vacuum filtered 14 from the paste to adjust the solvent content to about 0.25 cc to about 0.35 cc per gram of solids, i.e., the solids comprising the electrode active material, the conductive diluent and the binder. The resulting filter cake 16 is fed into a series of roll mills that calender the active admixture into a thin sheet having a tape form 18, or the active filter cake is first run through a briquette mill in the step designated 20. In the latter case, the active admixture is formed into small pellets that are then fed into the roll mills to form the active sheet in tape form.

Typically, the first calendering step 18 is performed by two to four calendar mills that serve to press the admixture between rotating rollers to provide a freestanding sheet of the active material as a continuous tape. The outer edges of the tape leaving the rollers are trimmed and the resulting tape is cut into blanks or plates 22.

Alternatively, the process includes the dropwise addition of a liquid electrolyte into the active mixture prior to the initial calendering step 18 to enhance the performance and rate capacity of an assembled electrochemical cell incorporating the active material.

The primary-calendered blanks 22 are further subjected to a secondary calendering step 24 to fibrillate the fluoropolymeric binder material in a second direction, other than the first direction. Preferably, the secondary calendering direction 24 is either orthogonal to or reverse to that which formed the freestanding sheet in step 18. However, in a broader sense the secondary calendaring step 24 is in any direction other than the first direction, and provides secondary-calendered blanks having a second thickness less than the first thickness.

The secondary-calendered blanks 24 are then subjected to a ternary calendering step 26. In step 26, the secondary-calendered blanks are preferably rotated 180° with respect to the direction the electrode admixture traveled when it entered the first calendering step 18. The secondary-calendered blanks 24 are further rotated 180° into a bottom over top orientation. It is believed that when the electrode active admixture is calendered in a single direction to form the sheet (step 18) the binder is fibrillated to an extent near its maximum tensile strength. If the electrode active blanks are calendered in a secondary direction (step 24), the active admixture spreads in directions other than, and preferably transverse to, the initial direction. Additionally, by calendaring the secondary-calendered blanks in the third direction rotated 180° from that which the electrode admixture was oriented when it was initially calendered, and in a bottom over top orientation, the resulting ternary-calendered blanks have a higher surface area and a lower basis weight than the sheet material and the secondary-calendered blanks formed from the primary and secondary calendering steps, respectively. In a broader sense, however, the secondary-calendered blanks 24 can be rotated in any direction that is not the same as the first direction the electrode active admixture was oriebted to form the freestanding sheet in step 18, but in a bottom over top orientation. The range of thicknesses for the ternary-calendered blanks is from about 0.004 inches to about 0.020 inches.

The thusly-formed ternary-calendered blanks are subsequently subjected to a drying step 28 under vacuum conditions. The drying step 28 serves to remove any residual solvent and/or water from the active material of the ternary-calendered blanks. The ternary-calendered blanks are stored for later use, or they are fed on a conveyor belt, as shown at step 30, to pressing stations 32 where electrode components are formed.

As further shown in FIG. 1, the method of the present invention contains several feedback loops that recycle electrode active material should quality control not be up to an acceptable level. This contributes to process yield, as very little active material is actually lost to waste. After the active admixture is pressed during step 18 by the first calender mills, if the resulting tape is too thin or otherwise of insufficient quality, the tape is sent to a recycler, indicated as step 34, that reintroduces the active admixture into the feed line entering the calender mills. If needed, the solvent concentration is adjusted during step 36 as needed, to provide a more uniform consistency to the admixture paste for rolling into the tape in step 18 and for subsequently forming the blanks in steps 24 and 26. This first recycle step 34 is also useful for reintroducing trimmings and similar leftover active material back into the feed line entering the calendar mills.

A second recycle loop removes the active material from the process after the secondary calendering step 24 and feeds back into the first calendar mills 18, through the recycler indicated in step 34 and the briquette mill in step 20, if that latter step is included in the process, as previously discussed. Again, the solvent concentration is adjusted during step 36 to produce a paste and filter cake 16 that is suitable for rolling into a tape 18 and that is subsequently processed into the secondary-calendered blanks 24 and, ultimately, the ternary-calendered blanks 26 according to the present invention.

The punching operation 30 serves to cut the ternary-calendered blanks into a variety of shapes including strips, half-round shapes, rectangular shapes, oblong pieces, or others, that are moved during step 32 to the pressing stations (FIG. 2) for fabrication of an electrode component for use in a high energy density electrochemical cell, as will presently be discussed in detail.

Figure 2:
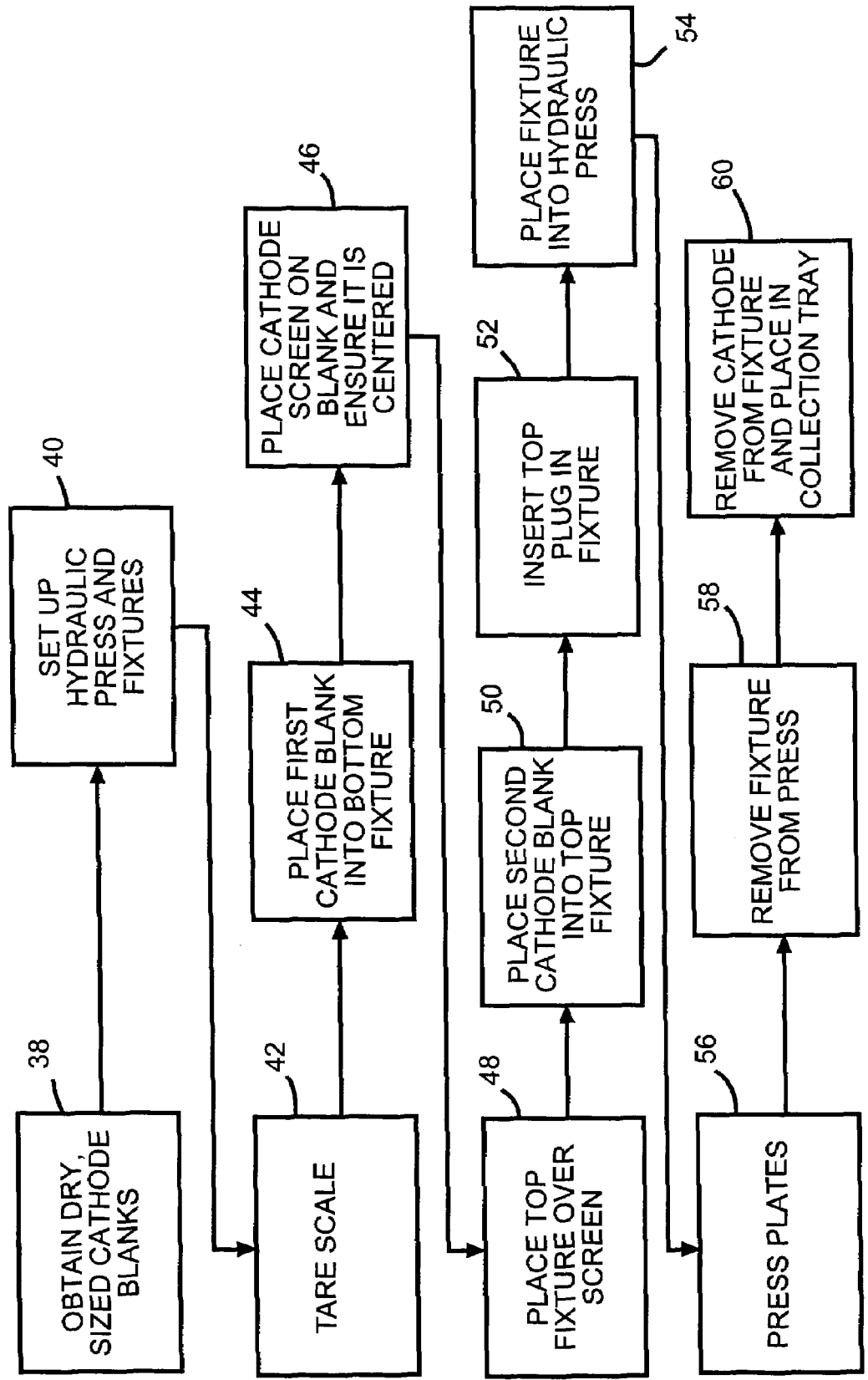
FIG. 2 is a block diagram and flow chart illustrating the steps involved in manufacturing an electrode component for use in an electrochemical cell from a blank of electrode active material made according to the steps illustrated in FIG. 1.

As illustrated in the block diagram flow chart shown in FIG. 2, during the electrode pressing process, dry ternary-calendered electrode blanks from step 30 (FIG. 1) are obtained during step 38 for operation thereon. A hydraulic press having platens or fixtures is provided at 40. Receptacle cups for the punched electrode blanks are weighted on a tare scale during step 42 and, as a quality control check, selected ones of the blanks are weighted in insure cross-sectional uniformity.

To build a cathode component, a first ternary-calendered blank is placed in a bottom fixture during step 44 and a current collector, such as an expanded metal screen, is placed on top of the blank during step 46. A top press fixture is then positioned on the bottom fixture and over the current collector screen, as indicated at 48. This fixture receives a second shaped ternary-calendered blank during step 50 followed by a top plug during step 52 that closes the fixture assembly. The fixture assembly is then inserted into the hydraulic press, as indicated at 54, which compresses the two electrode blanks together 56 with the current collector sandwiched therebetween to form the electrode component as a laminate.

Following the pressing step, the fixture assembly is removed from the press during step 58 and the electrode component is separated from the press fixture and placed into a collection tray during step 60. The electrode component is stored for later use, or it is incorporated into a high energy density primary or secondary electrochemical cell, as is well known to those of ordinary skill in the art.

In that respect, a cathode component prepared by the method of the present invention can be used, for example, in a nonaqueous electrochemical cell as described in U.S. Pat. No. 4,830,940 to Keister et al., which patent is assigned to the assignee of the present invention and incorporated herein by reference. The electrochemical cell contains an anode of a metal selected from Group IA of the Periodic Table of Elements, including lithium, sodium, potassium, etc., preferably lithium, and their alloys and intermetallic compounds, for example Li—Si, Li—Ai, Li—B and Li—Si—B alloys and intermetallic compounds. The form of the anode may vary, but typically the anode is in the form of a thin sheet or foil of the anode metal, and a current collector having an extended tab or lead affixed to the anode sheet or foil.

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

A suitable electrolyte for a primary electrochemical cell has an inorganic, ionically conductive salt dissolved in a nonaqueous solvent. More preferably, the electrolyte includes an ionizable alkali metal salt dissolved in a mixture of aprotic organic solvents comprising a low viscosity solvent and a high permittivity solvent. In the case of an anode comprising lithium, the alkali metal salt is lithium based. Known lithium salts useful as vehicles for transport of lithium ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), diethyl carbonate, ethyl methyl carbonate, and mixtures thereof. High permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

In secondary electrochemical systems, the anode or negative electrode comprises a material capable of intercalating and de-intercalating the alkali metal, and preferably lithium. A carbonaceous anode comprising any of the various forms of carbon (e.g., coke, graphite, acetylene black, carbon black, glassy carbon, pitch carbon, synthetic carbon, mesocarbon microbeads, and mixtures thereof), which are capable of reversibly retaining the lithium species, is preferred. Graphite is particularly preferred due to its relatively high lithium-retention capacity.

A typical secondary cell negative electrode is fabricated by mixing about 90 to 97 weight percent graphite with about 3 to 10 weight percent of a binder material. The binder is preferably a fluoro-resin powder such as polytetrafluoroethylene (PTFE), polyvinylidene fluoride (PVDF), polyethylenetetrafluoroethylene (ETFE), a polyamide or a polyimide, and mixtures thereof. This anode active admixture is contacted to a metallic current collector usually made from a thin foil of copper, nickel, and nickel-plated steel, stainless steel or titanium.

The positive electrode comprises at least one of the above-described cathode active materials mixed with a suitable conductive diluent including acetylene black, carbon black and/or graphite. Metal powders of nickel, aluminum, titanium and stainless steel are also useful conductive diluents. The positive electrode further comprises a fluororesin binder, preferably in a powder form, such as PTFE, PVDF, ETFE, a polyamide or a polyimide, and mixtures thereof. The cathode active admixture is contacted to a metallic current collector usually made from a thin foil of copper, nickel, and nickel-plated steel, stainless steel or titanium.

The preferred electrolyte for the secondary cell includes an alkali metal salt dissolved in a quaternary, nonaqueous carbonate solvent mixture consisting of about 10% to about 50% ethylene carbonate, about 5% to about 75% dimethyl carbonate, about 5% to about 50% ethyl methyl carbonate and about 3% to about 45% diethyl carbonate, by volume. For a more thorough discussion of such an electrolyte, reference is made to U.S. Pat. No. 6,153,338 to Gan et al., which is assigned to the assignee of the present invention and incorporated hereby by reference.

The preferred form of the primary and the secondary electrochemical cell is a case-negative design wherein the anode/cathode couple is inserted into a conductive metal casing connected to the anode current collector, as is well known to those skilled in the art. A preferred casing material is titanium although stainless steel, mild steel, nickel, nickel-plated mild steel and aluminum are also suitable. The casing header comprises a metallic lid having an opening for the glass-to-metal seal/terminal pin feedthrough for the cathode electrode and an electrolyte fill opening. The cell is thereafter filled with the appropriate electrolyte solution and hermetically sealed such as by close-welding a stainless steel plug over the fill opening, but not limited thereto. The cell of the present invention can also be constructed in a case-positive design. The following examples describe the manner and process of manufacturing an electrochemical cell according to the present invention, and they set forth the best mode contemplated by the inventors of carrying out the invention, but they are not to be construed as limiting.

EXAMPLE

Silver vanadium oxide of an average particle size of about 20 μm produced in a Union Process Attritor Mixer Model 1-S was mixed in a Ross Power Mixer Model PD-2 with Ketjenblack® carbon, graphite and polytetrafluoroethylene (PTFE) in excess Isopar G solvent. The mass ratio of the SVO/PTFE/carbon/graphite was about 94/3/1/2. The Isopar G solvent was vacuum filtered from the mixture so that the final solvent content was about 0.27 cc to about 0.30 cc Isopar G/gram of solids. The resulting filter cake was broken up, manually homogenized and passed through a Fitzpatrick L83 Chilsonator to form pellets. The pellets were fed through a continuous three-roll mill to form a tape of SVO sheet. The sequential roll mill gaps were set at 0.021", 0.019" and 0.018".

The thusly-formed sheet tape was cut into 3"×5" blanks, which were divided into two groups. The first group had the blanks then turned to an orientation of about 90° to that of the sequential roll mill gaps. This first group is termed the "orthogonal" blanks.

The second group had the blanks turned to an orientation of about 90° to that of the sequential roll mill gaps. Additionally, the second group had the blanks turned upside down and another 90° for the last roll mill. The orientation of the blanks going through the final roll mill is upside down and 180° from the initial three roll mill direction. This second group is termed the "flop" blanks.

The orthogonal and flop blanks were then incorporated into electrochemical cells. In particular, one of the blanks was coupled with a sheet of lithium supported on a nickel current collector. The cathode blanks were supported on a titanium current collector. The anode and cathode electrodes were segregated from each other by a separator and activated with an electrolyte containing 1M LiPF$_6$ in a 50:50, by volume, mixture of DME and PC. The thusly-manufactured cells were then acceptance pulse discharge tested. They were initially discharged under 3.57K ohm load for 15 hours. Then, after resting for one week a single pulse train consisting of four 10 second 2.0 A pulses was applied to each cell. These pulses were separated from each other by a 15-second rest period.

Figure 3:
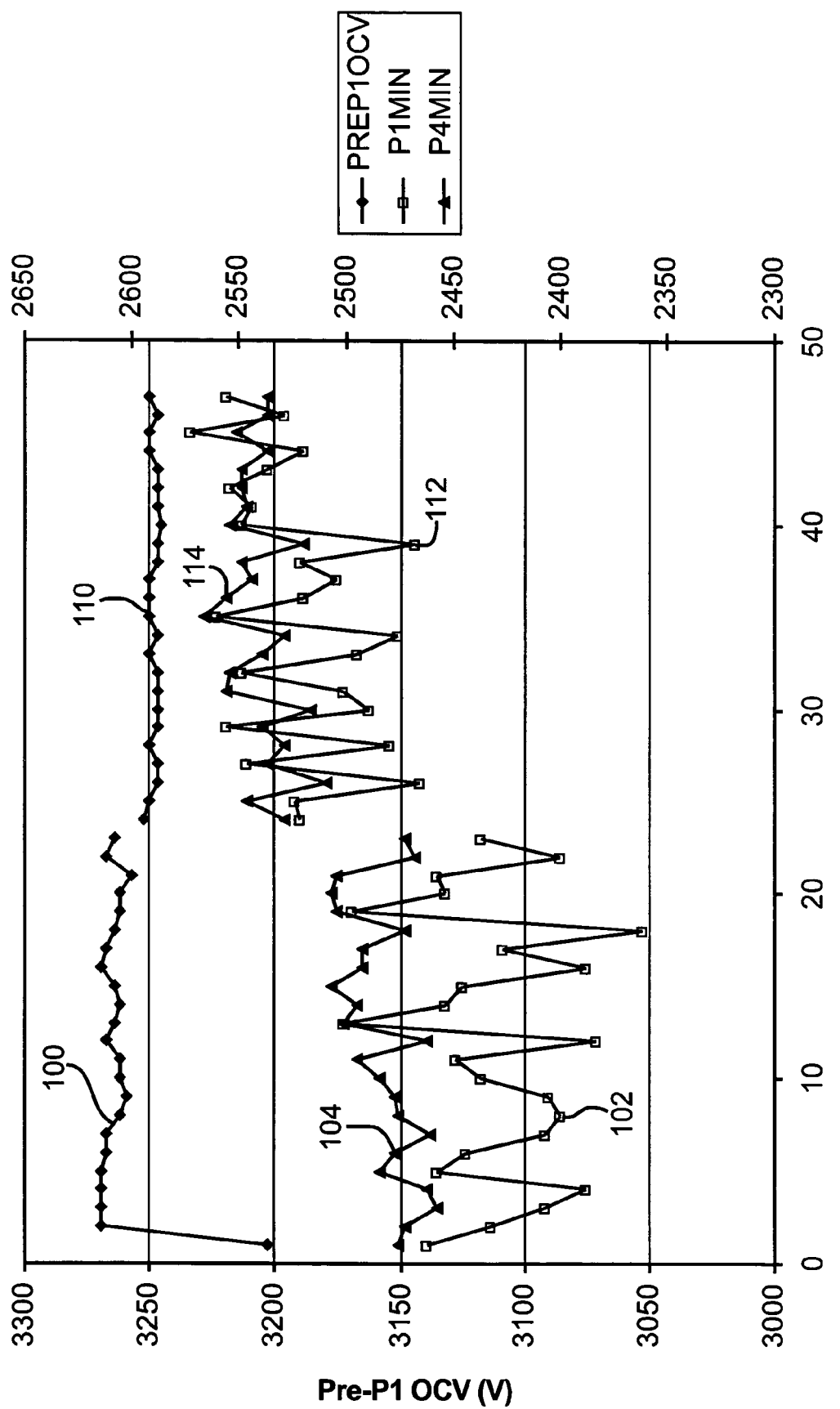
FIG. 3 is a graph of the pulse discharge results from a plurality of lithium cells having cathodes made according to the prior art in comparison to ones having cathode of the present invention.

The discharge results are shown in FIG. 3. In this graph, curve 100 was constructed from the pre-pulse voltage of the orthogonal cells. Curves 102 and 104 are from the pulse 1 minima and the pulse 4 minima voltages, respectively, from the orthogonal cells. Similarly, curve 110 was constructed from the pre-pulse voltage of the floppy cells. Curves 112 and 114 are from the pulse 1 minima and the pulse 4 minima voltages, respectively, from the floppy cells.

The discharge results show that while the pre-pulse voltages for the floppy cells were somewhat lower than those for the orthogonal cells, they are more consistent. Furthermore, the floppy cells had significantly higher pulse 1 and pulse 4 minima voltages than the orthogonal cells. These increased discharge voltage directly relate to greater discharge efficiency and more delivered capacity to the device powered by the cell.

It is appreciated that various modifications to the inventive concepts described herein may be apparent to those skilled in the art without departing from the spirit and scope of the present invention as defined by the hereinafter appended claims.

What is claimed is:

1. A method for preparing an electrode, comprising the steps of:
   a) providing an electrode active material;
   b) mixing the electrode active material with a fluoro-polymeric material in a solvent to form an electrode admixture paste comprising the electrode active material;
   c) calendering the paste into a first structure of the electrode admixture having a first thickness by contacting the paste in a first direction;
   d) calendering the first structure into a second structure having a second thickness less than the first thickness by contacting the electrode admixture in a second direction having the first structure rotated bottom over top with respect to the orientation that formed the first structure to thereby form an electrode active structure; and
   e) contacting the electrode active structure to at least one of a first and second major surfaces of a conductive substrate.

2. The method of claim 1 including calendaring the first structure into an intermediate structure before forming the second structure, the intermediate structure having an intermediate thickness less than the first thickness by contacting the electrode admixture in a direction substantially orthogonal to or in a reverse direction to that which formed the first structure.

3. The method of claim 1 including adding a conductor material to the electrode admixture.

4. The method of claim 1 including providing the paste comprised of about 3 weight percent carbon, 3 weight percent of the fluoro-polymeric material and about 94 weight percent of the electrode active material.

5. The method of claim 1 including providing the electrode active material comprising a metal-containing material.

6. The method of claim 1 including selecting the solvent from the group consisting of water and an inert organic material.

7. The method of claim 1 including subjecting the electrode active material to a grinding step that reduces its particle size from a granular electrode active material to a finely divided particle size prior to mixing with the fluoro-polymeric material and the solvent forming the paste.

8. The method of claim 1 including forming the paste into the cathode sheet by feeding the paste through a series of roll mills as the first calendering step forming the first structure.

9. The method of claim 1 including the step of first feeding the paste into a compaction mill that serves to provide the electrode active material in a pellet form prior to introduction to the first calendaring step.

10. The method of claim 1 including selecting the electrode active material from the group consisting of carbon, fluorinated carbon, silver vanadium oxide, copper silver vanadium oxide, manganese dioxide, titanium disulfide, cobalt oxide, nickel oxide, copper vanadium oxide, $LiNiO_2$, $LiMn_2O_4$, $LiCoO_2$, $LiCO_{0.92}Sn_{0.08}O_2$, $LiCo_{1-x}Ni_xO_2$, and mixtures thereof.

11. The method of claim 1 wherein the step of forming the paste into the electrode active structure further comprises the dropwise addition of a liquid electrolyte.

12. The method of claim 1 wherein the electrode active structure has a thickness in the range of from about 0.004 inches to about 0.020 inches.

13. The method of claim 1 including removing residual solvent from the electrode active material by drying the electrode active material.

* * * * *

UNITED STATES PATENT AND TRADEMARK OFFICE
CERTIFICATE OF CORRECTION

| | |
|---|---|
| PATENT NO. | : 7,252,797 B2 |
| APPLICATION NO. | : 10/669080 |
| DATED | : August 7, 2007 |
| INVENTOR(S) | : Panzer et al. |

It is certified that error appears in the above-identified patent and that said Letters Patent is hereby corrected as shown below:

Column 3, line 6, delete "$LiCu_{0.92}Sn_{0.08}O_2$" and insert -- $LiCo_{0.92}Sn_{0.08}O_2$ --.

Column 3, line 6, delete "$LiCO_{1-x}Ni_xO_2$" and insert -- $LiCo_{1-x}Ni_xO_2$ --.

Column 9, line 10, delete "$LiCO_{0.92}Sn_{0.08}O_2$" and insert -- $LiCo_{0.92}Sn_{0.08}O_2$ --.

Signed and Sealed this

Twenty-seventh Day of January, 2009

JOHN DOLL
*Acting Director of the United States Patent and Trademark Office*